O. A. LABUS.
GLOBE VALVE.
APPLICATION FILED JAN. 19, 1918.
1,301,278. Patented Apr. 22, 1919.
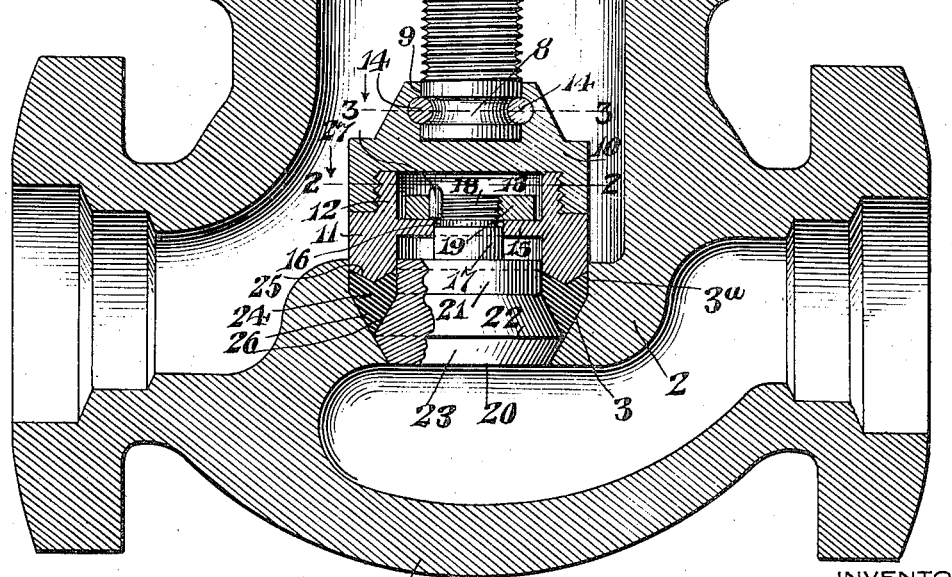
WITNESSES
Jas. K. McCathran
F. T. Chapman
INVENTOR
Otto A. Labus,
BY
ATTORNEY

UNITED STATES PATENT OFFICE.

OTTO AUGUST LABUS, OF GRAND RAPIDS, WISCONSIN.

GLOBE-VALVE.

1,301,278.  Specification of Letters Patent.  Patented Apr. 22, 1919.

Application filed January 19, 1918. Serial No. 212,681.

*To all whom it may concern:*

Be it known that I, OTTO A. LABUS, a citizen of the United States, residing at Grand Rapids, in the county of Wood and State of Wisconsin, have invented a new and useful Globe-Valve, of which the following is a specification.

This invention has reference to globe valves, and its object is to provide a valve particularly adapted for tightly closing against high pressures of either liquid, air or gas.

In accordance with the invention, the valve member closing into the valve seat in the globe valve is carried by a screw spindle or stem, in such a manner that the stem, in turning about its axis, does not impart rotative movement to the valve member when it is seated. Moreover, there is provided a valve ring or gasket of some suitable soft material either metallic, fibrous, or of other nature, and a block or anvil between which and the body of the valve member the gasket is subjected to pressure in a manner to force it both against the valve seat and against the anvil or backing member, with the gasket completely housed in metal when the valve is in the closed position, and with the gasket in the path of any possible leakage.

The invention will be best understood from a consideration of the following detailed description, taken in connection with the accompanying drawing forming part of this specification, with the further understanding that, while the drawing shows a practical form of the invention, the latter is not confined to any strict conformity with the showing of the drawings but may be changed and modified so long as such changes and modifications come within the scope of the appended claims.

In the drawing:—

Figure 1 is a longitudinal central section of the valve, with some parts in elevation;

Fig. 2 is a section on the line 2—2 of Fig. 1, omitting distant parts.

Fig. 3 is a section on the line 3—3 of Fig. 1, omitting distant parts.

Referring to the drawings, there is shown a valve body or casing 1, which may follow the usual lines of a globe valve. In the customary division wall 2 between the inlet and outlet of the valve casing, there is formed a valve seat 3 tapering in a direction away from a valve stem 4 having screw threads 5 engaging in similar screw threads in a bonnet 6. The seat 3 has a continuation 3ª at the large end, the taper portion extending but part of the distance through the wall 2. While not restricted to any particular angle, the taper portion of the seat 3 may slant at about 60° to the plane of the surface of the wall 2 through which the small end of the taper seat opens.

The stem 4 is provided at one end with a manipulating wheel 7 as is customary, and at the other end is continued for a distance free from screw threads 5, and is there provided with a circumferential groove 8, shown in Fig. 1 as an approximately semi-circular groove in cross section. The grooved end of the stem 4 is seated in a recess 9 axially formed in a bonnet 10 constituting one portion of a valve member comprising in addition to the bonnet 10 a ring 11 having at one end a flange 12 screwed into a recess 13 in the adjacent face of the bonnet 10. In order to secure the stem 4 in the recess 9, the adjacent portions of the bonnet 10 are traversed by pins 14 entering the groove 8 so that the valve stem may be turned about its longitudinal axis without causing the valve member carried thereby to turn with it.

The ring 11 is provided with an intermediately located diaphragm 15 having a central passage 16 therethrough. Extending through the passage 16 is a stem 17 which may quite snugly yet freely fit the passage, and this stem has a continuation 18 screw threaded for the reception of a nut 19 located in the interior of the bonnet or recess 13. That end of the stem 17 remote from the screw threaded portion 18 carries a block 20 having a cylindrical portion 21 immediately adjacent to the stem 17, and from thence expanding as shown at 22 and then contracting as shown at 23, so that the main portion of the block 20 is reversely beveled. The angle of the bevel portion 23 corresponds to the tapering portion of the valve seat, wherefore the portion 23, when lowered into the valve seat, will form a closure therefor.

The edge of the ring 11 remote from the bonnet 10 is doubly beveled toward the mid line thereof at a more obtuse angle than the taper of the valve seat 3, and while not confined strictly to any particular angle, the taper of the bevels may be about 30°.

Surrounding the block 20 along the cylindrical portion 21 and taper portion 22 is a packing ring or gasket 24, having at one edge a doubly tapered seat 25 entered by the doubly tapered edge of the ring 11, while the other edge of the ring 24 is also doubly tapered as indicated at 26, with the angle of taper corresponding to that of the taper portion of the seat 3 and of the bevel of the part 22 of the block 20. The remaining walls of the ring 24 are cylindrical, so as to engage the extensions 3ª of the valve seat and the cylindrical part 21 of the block 20.

When the parts are assembled, the block 20 supports the ring 24 and holds it against the doubly beveled edge of the ring 11, and the nut 19 is screwed upon the screw threaded portion 18 of the stem 17 sufficiently to hold the ring 24 on the block 20. A hole is then bored at a suitable point where the threads of the nut 19 and threaded extension 18 intermesh, and a pin 27 is inserted in the hole, so that the nut is thereby locked against unscrewing. The assembling of the block 20 and gasket 24 in the ring 11 is performed before the ring 11 is screwed into the bonnet 10. By properly proportioning the parts, the pin 27 need not be driven into the hole provided for it so tightly as to interfere with the removal of the pin when desired, since the clearance between the pin and the bonnet may be made smaller than the length of the pin, and its escape from the hole when the parts are so assembled is prevented.

The block 20 is preferably a solid block, so that there are no joints or passages through the block through which fluid under high pressure may find escape. The only path of fluid between the inlet and outlet ends of the valve casing, when the valve is closed, is by way of the valve seat and by the ring 24 where engaging the valve seat, and where engaging the block 20.

On closing the valve, the block 20 has its bevel end 23 brought into engagement with the small end portion of the taper valve seat, thus arresting any further movement of the block 20 into the seat. Continued movement, however, of the valve stem is participated in by the ring 11, and this serves to compress the ring or gasket 24 between the block 20 and the valve seat 3, the parts being so proportioned that the beveled end of the ring 11 enters the valve seat so that the gasket 24 is then wholly inclosed in metal walls. The gasket 24 may be of a soft metal such as lead, or of some suitable fibrous material, or of rubber, or any other material adapted to the purpose. The action of the ring 11 upon the packing ring or gasket 24 is to expand the ring against the valve seat and against the block 20, thus effectively closing any avenue of escape of fluid through the valve. The closure is effective even though particles of grit or the like find lodgment on the valve seat or on the block 20, but the absence of any ledges or the like where the valve member seats reduces the liability of accumulations of grit to a minimum. Even should particles of grit lodge on the valve seat, the expansion of the ring or gasket 24 will embed the particles and prevent leakage. Moreover, the taper form of the seating portion of the gasket and the opposed tapers of the valve seat and the block 20 where receiving the gasket all contribute to a firm seating of the gasket, and an effective sealing of the passage through the wall 2 with a minimum amount of effort exerted on the valve stem in a direction to compress the gasket. No matter how great a pressure is exerted upon the gasket 24 in seating it, it is not subjected to distorting twists after being brought to its seat and while being subjected to sealing pressure. Nor will there be any leakage whether the pressure be exerted upon the closed valve through either end of the casing.

What is claimed is:—

1. A valve provided with a valve seat, and a compression member for engaging the valve seat, said compression member including a block for entering and engaging the valve seat, a gasket surrounding the block and also arranged to enter and engage the valve seat, and means for engaging the gasket to compress it oppositely against both the block and valve seat, the valve seat being tapered, the engaging faces of the gasket and block with the valve seat being correspondingly tapered and the engaging faces of the gasket and block with each other being tapered oppositely to the first-named tapered portions of the gasket and block and all the tapered portions being in the direction of movement of the block into the valve seat.

2. A valve structure provided with a valve seat having a cylindrical entering portion and tapering therefrom to the other end, and a compression member including a cylindrical portions of a size to enter the cylindrical portion of the valve seat, a block or anvil having a reversely tapered portion with one tapered part corresponding to the taper of the valve seat to fit the latter at its smaller end, and a packing gasket between the other taper portion of the block and the cylindrical portion of the compression member, and of a circumference to enter the cylindrical end of the valve seat, said gasket being doubly tapered to correspond to the second-named taper portion of the block and the taper portion of the valve seat.

3. A valve provided with a tapering valve seat having a substantially cylindrical extension at its larger end, and a valve member for entering the valve seat, said valve member comprising two parts, one part being in the form of a block carried by the other part and movable relative thereto and provided with a reversely tapered portion with one taper adapted to fit the taper portion of the valve seat and the other taper portion tapering away from the valve seat, a gasket having a doubly tapered end to fit between the second-named taper of the block and the taper of the valve seat, and of a size to also enter the cylindrical extension of the valve seat, and a compression part engaging the gasket on the edge remote from the taper edge to spread the gasket against the valve seat and against the block.

4. A valve provided with a tapering valve seat having a substantially cylindrical extension at its larger end, and a valve member for entering the valve seat, said valve member comprising two parts, one part being in the form of a block carried by the other part and movable relatively thereto and provided with a reversely tapered portion with one taper adapted to fit the taper portion of the valve seat, and the other taper portion tapering away from the valve seat, a gasket having a doubly tapered end to fit between the second named taper of the block and the taper of the valve seat, and of a size to also enter the cylindrical extension of the valve seat, and the compression member engaging the gasket on the end remote from the taper end to spread the gasket against the valve seat and against the block, said compression member having the edge engaging the gasket doubly beveled, and the gasket having a corresponding groove to facilitate the expansive action of the compression member on the gasket.

5. A valve having a valve seat of taper form with the entering end cylindrical, and a valve member for entering the valve seat comprising a bonnet portion, a ring portion carried by the bonnet portion and of a diameter to enter the cylindrical end of the valve seat, said ring portion having the edge remote from the bonnet portion doubly tapered and also provided with an intermediate interior web having a passage therethrough, a block provided with a stem extending through the web and screw threaded at the end for the reception of a nut to hold the block to the ring, with the block having a range of movement axially of the ring, said block having the end remote from the stem reversely tapered, with the taper at the end of the block adapted to fit the taper of the valve seat at its smaller end, and the other taper being away from the taper portion of the valve seat, and a gasket having one edge grooved to receive the taper portion of the ring and the other edge doubly tapered to correspond to the taper of the valve seat and the second-named taper of the block.

6. A valve having a valve seat of taper form with the entering end cylindrical, and a valve member for entering the valve seat comprising a bonnet portion, a ring portion carried by the bonnet portion and of a diameter to enter the cylindrical end of the valve seat, said ring portion having the edge remote from the bonnet portion doubly tapered and also provided with an intermediate interior web having a passage therethrough, a block provided with a stem extending through the web and screw threaded at the end for the reception of a nut to hold the block to the ring, with the block having a range of movement axially of the ring, said block having the end remote from the stem reversely tapered, with the taper at the end of the block adapted to fit the taper of the valve seat at its smaller end, and the other taper being away from the taper portion of the valve seat, and a gasket having one edge grooved to receive the taper portion of the ring and the other edge doubly tapered to correspond to the taper of the valve seat and the second-named taper of the block, said valve structure also being provided with a valve stem having a screw feed and swiveled to said bonnet portion, whereby the valve stem may be turned after the valve member is seated to expand the gasket without exerting twisting strains on said valve member.

7. A valve structure provided with a tapering valve seat, and a closing member for the valve seat comprising a backing device or anvil for entering and engaging the valve seat, a gasket with walls doubly tapered in the direction of the movement of the gasket into and out of the valve seat and engaging and supported by the anvil, and a compression device for the gasket movable against the latter toward the anvil to spread the taper walls of the gasket in a direction transverse to the movement of the gasket and into engagement with the taper valve seat and the anvil to seal the valve against passage of liquid through the valve seat.

8. A valve structure having a tapering valve seat and a closure therefor, comprising a block adapted to enter the valve seat, and a gasket carried by the block, said gasket being doubly tapered in the direction of movement of the gasket into the valve seat, and the block where carrying the gasket being oppositely tapered with respect to the taper of the valve seat, and means for compressing the gasket against the block and valve seat, whereby the block rests on the valve seat and the gasket engages both the valve seat and block when the valve is closed.

9. A valve structure provided with a tapering valve seat, an imperforate block having a reversely tapered portion, with one part of the taper adapted to enter and engage the tapered valve seat and the other part of the taper receding from the tapered valve seat, a gasket with walls doubly tapered in the direction of its movement into and out of the valve seat for engaging the tapered portion of the latter and the second-named tapered part of the block, a bonnet having means for engaging and expanding the gasket against the block and valve seat, a connection between the block and the bonnet arranged interiorly of said bonnet, and a valve stem connected to the bonnet, the connection of the valve stem to the bonnet being independent of the connection of the block to the bonnet, whereby all paths of escape for fluid through the valve structure are effectively sealed, when the valve is closed by the block and gasket, where the block engages the valve seat and the gasket engages both the block and valve seat.

In testimony that I claim the foregoing as my own, I have hereto affixed my signature in the presence of two witnesses.

OTTO AUGUST LABUS.

Witnesses:
P. F. SWARTZ,
W. F. SCHNEIDER.